April 15, 1969     W. H. PLUMPE, JR     3,438,244
FLUID MEASURING GAUGE
Filed Aug. 23, 1965
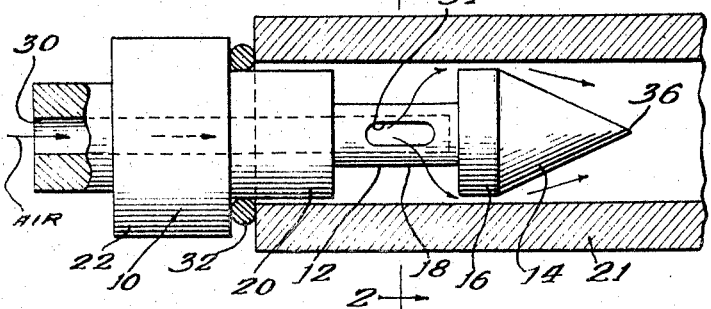
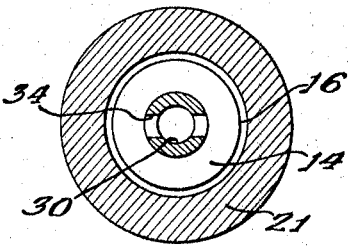
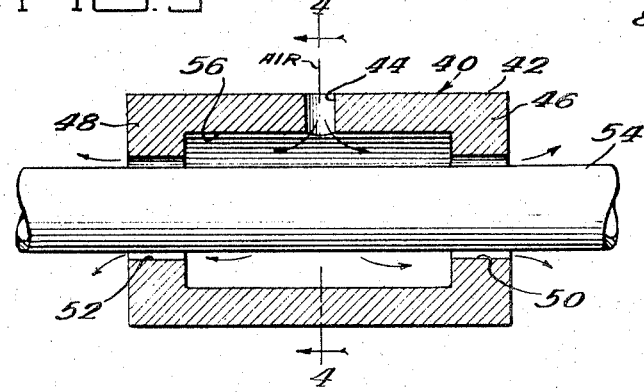
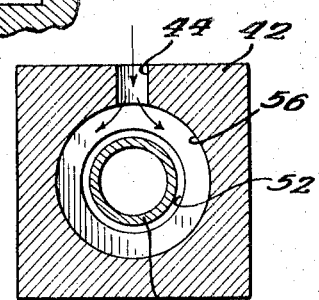
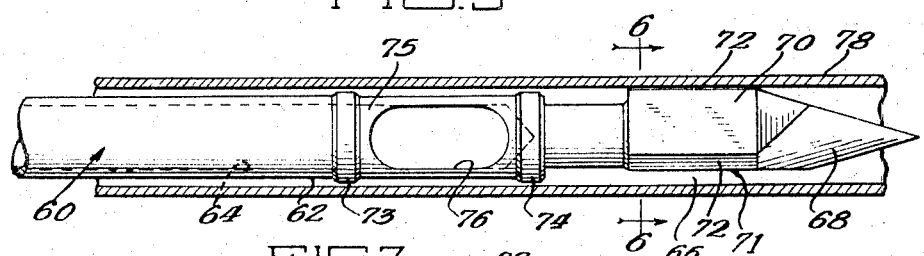
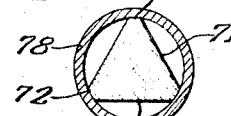
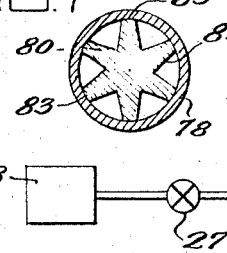
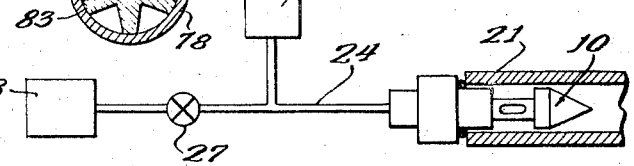
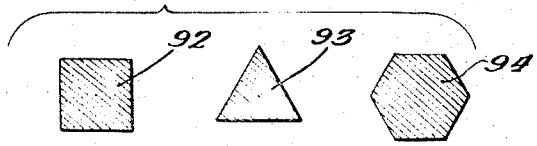
Inventor:
William H. Plumpe Jr.
By: Hofgren, Wegner, Allen,
Stellman & McCord
Attorneys

United States Patent Office 3,438,244
Patented Apr. 15, 1969

3,438,244
FLUID MEASURING GAUGE
William H. Plumpe, Jr., St. Louis, Mo., assignor to Brunswick Corporation, a corporation of Delaware
Filed Aug. 23, 1965, Ser. No. 481,846
Int. Cl. G01b 13/20, 13/10
U.S. Cl. 73—37.9                                     5 Claims

ABSTRACT OF THE DISCLOSURE

A gauge for measuring the dimension of parts through a fluid medium including a member having a fluid passage. The gauge has a gauging surface of substantially uniform predetermined cross section. An orifice establishes communication between the fluid passage and the exterior for permitting air under pressure to be directed past the predetermined cross sectional area. The orifice is of a size in relationship to the fluid passage so as to create no back pressure in fluid fed through the passage.

---

This invention relates to gauges and more particularly to gauge heads for use with air or fluid gauges for dimensioning parts Fluid gauges have been known and used for many years to measure diameters of the inside of tubes, pipes, apertures, openings, blind holes and the like. The principle upon which most of these fluid gauges operate is based upon the assumption that the diameter of the opening is uniform or, stated another way, that the inside of the opening is a perfect circle. Since the opening is considered to be a perfect circle, one measurement of one diameter was considered to be enough to compute the cross sectional area of the opening. Some designers recognized that the circle might not be perfect and accordingly provided gauges which in effect measured two or more diameters, which measurement gave an average diameter for computing the area of the opening.

Although the later method was an improvement over the first in providing greater accuracies of measurement, it still fell far short of the accuracy of measurements of cross sectional areas, both internal and external, of tubes, apertures, and the like that are required today in the medical, scientific and other fields. In addition, the gauges were completely incapable of measuring the cross sectional areas of squares, rectangles, triangles and the like.

It is therefore a principal object of my invention to overcome the disadvantages of the prior art and to provide an improved fluid gauge adapted to accurately measure in a plane transverse to the axis of the part either the cross sectional area of an internal opening in the part or the cross sectional area of the part measured from the circumference of the part lying in said plane.

It is another object of my invention to provide an improved fluid gauge capable of measuring the cross sectional opening of a workpiece no matter how irregular the surface of said opening and no matter what the cross sectional shape of the opening.

Another object of my invention is to provide an improved fluid gauge for accurately measuring in a plane transverse to the axis of the part the outside cross sectional area of the part or the like no matter how irregular or no matter what the shape of the outside surface of the part might be.

And another object of my invention is to provide an improved gauge for measuring cross sectional areas of tubes or apertures no matter how long or short the tubes or apertures might be.

Still a further object of my invention is to provide an improved method of measuring either internal or external cross sectional areas.

A further object of my invention is to provide an improved gauge head having no moving parts, no valves and in some forms of the invention, requiring no seals.

A still further object of my invention is to provide an improved gauge head that can be made for use in very small diameter apertures or for very small outside diameter members since there are no moving parts or valves that would limit the size of the gauge head.

And still a further object of my invention is to provide an improved gauge for accurately measuring cross sectional areas of a plurality of cross sectional shapes.

Still another object of my invention is to provide an improved gauge head that will be not only economical to make and use, but also economical to maintain.

Other objects and advantages of my invention will be apparent from the following description, the appended claims and the accompanying drawing, in which:

FIGURE 1 is a side elevation of one form of my improved fluid gauge head partially in section and shown in position in a generally circular part or workpiece;

FIGURE 2 is a cross sectional view taken along the line 2—2 of FIGURE 1;

FIGURE 3 is an elevational view in section of another form of an improved fluid gauge head embodying my invention;

FIGURE 4 is a cross sectional view taken along the line 4—4 of FIGURE 3;

FIGURE 5 is an elevation view of still another form of my improved fluid gauge head embodying my invention and in position in a workpiece;

FIGURE 6 is a cross sectional view taken along the line 6—6 of FIGURE 5;

FIGURE 7 is a modified form of cross sectional shape of the probe of FIGURE 6;

FIGURE 8 is a schematic view of my improved fluid gauge head connected to a pressure gauge and to a fluid source;

FIGURE 9 is a cross sectional view of another modified form of my invention in position in a blind hole for dimensioning the hole; and FIGURE 10 is a view illustrating a few additional cross sectional shapes that can be measured with my invention.

As modern technology in medicine, science, and the like continues to progress, greater and greater demands are made for products made under extremely tight specifications. This is particularly true in the area of measuring the dimensions of parts both internal and external. As an example, in the past it was possible to supply tubing wherein the internal cross sectional area was computed based on measurements of two or more diameters which were then averaged for determing the cross sectional area of the tube. In tubes that were out of round, i.e., elliptical in cross section, or had flat sections along one or more of the sides, the computation of the cross sectional area was quite inaccurate and oftentimes resulted in passing on to a customer substandard goods. This is no longer acceptable.

In the present invention a gauge head is provided which in one form is circular in shape and can be inserted in a tube or aperture to be measured. The gauge head has a slightly recessed portion which is in unrestricted communication with a source of fluid pressure. One or more gauging means are provided on the gauge head at least between the recessed portion and the front end of the gauge head so that a flow of fluid under pressure will flood into the recessed portion and between the gauging means and the inside wall of the tube or aperture being measured. The amount of fluid flowing between the gauge means and the wall of the tube or aperture is calibrated to produce a cross sectional dimension of the tube or aperture. When the wall of the inside of the tube has flats, ribs, shallow grooves and the like, they will all contribute to restricting or enlarging the flow of fluid between the gauge means and the tube so as to be taken into consideration in the computation of the cross sectional dimension of the tube. Due to the lack of moving parts in the improved gauge, it is possible to measure diameters and cross sectional areas, internal and external, not heretofore possible.

Referring more particularly to the drawing in which the same reference numerals are applied to the like parts in the different views, one form of my improved fluid gauge head 10 is shown and comprises a tubular body member 12 having a probe portion 14, a gauging surface 16, a recessed sleeve or portion 18, a guide 20 and a stop or shoulder 22. The body portion 12, including the probe 14, surface 16, recessed portion 18, and guide 20 are inserted in a tube 21 to be dimensioned. The gauge head 10 is shown in FIGURE 8 connected by means of a flexible tube 24 with a pressure gauge 26, a needle valve 27 and a source 28 of fluid pressure such as air under pressure. The gauge 26 can be appropriately calibrated to read cross sectional area in square inches or some such desired reading.

The gauge head 10 has the body member or portion 12 hollowed or apertured at 30 which extends only part way through said body member from the shouldered end thereof to a point just short of the probe 14. The enlarged abutment or shoulder member 22 is formed integrally with said body member 12 near one end of said gauge head. Stepped down from said shoulder member 22 is the cylindrical portion or guide 20 joined with the shoulder 22 to provide a seat for an O-ring type seal member 32. Integrally connected to the cylindrical portion or guide 20 is the recessed segment or portion 18 of the gauge head, which recessed portion has a pair of large elongate openings 34 communicating with the aperture 30 in the gauge head. The openings 34 are shown as oppositely spaced from each other diametrically across the center of the recessed portion 18. One, two or more recesses 34 could be formed therein without departing from the spirit of this invention.

The purpose of the openings 34 is to permit a substantially unrestricted flow of fluid from a source of fluid under pressure to the recessed portion or area 18 of the gauge head. The probe 14 is integrally formed with the body member 12 on the front end of the gauge head and in the illustrated form, has a conically shaped front end converging to a point 36 with the base of the cone blending into the cylindrical gauging surface 16. The gauging surface 16 serves as a gauging ring or gaging member for the gauge head and is manufactured with a predetermined relatively uniform cross sectional shape throughout the axial length thereof and about the cylindrical surface thereof. The gauging head 16 is hardened or in some other way treated so as not to wear throughout its axial length upon repeated insertions and removals from a tube, sleeve or other apertured workpiece, i.e., the tube 21.

In the form of my invention shown in FIGURES 1 and 2, the gauge head 10 has the probe 14 inserted in the end of a tube to be dimensioned with the guide 20 aligning the gauge head with the tube. The sealing ring 32 is urged against the axial end face of the tube so as to prevent fluid from flowing around that end of the gauge head. Fluid such as air is permitted to enter the gauging head 10 through the aperture 30. The unrestricted flow of the fluid or air from the apertures 34 into the recessed area 18 between the probe 14 and the guide member 20 is substantially without back pressure on the pressure gauge 26. The fluid or air will escape around the periphery of the gauging head 16 a predetermined amount according to the difference between the cross sectional area of the probe at the gauging ring or surface 16 and the cross sectional area of the inside of the tube 21. The pressure gauge 26 has been precalibrated so that for a given pressure of fluid escaping between the gauging surface 16 and the inside of the tube, a cross sectional area of the internal portion of the tube aligned with the gauging ring or surface 16 becomes known.

No matter whether the tube 21 has flat portions, minor ribs, grooves or other irregularities in its surface, the amount of air or fluid passing the gauging head or ring 16 of the probe 14 is equated to a cross sectional dimension for the tube that can be immediately read from the pressure gauge 26. Using the invention, gauges have been made and used successfully with diameters in the order of .019 inch for measuring the cross sectional area of comparably sized tubes.

The needle valve 27 in the air or fluid line from the fluid source 28, FIGURE 8, limits the flow of air into the system so that the gauge 26 will read near zero when the gap around the gauge head 16 is large. In some respects, the effect of the gauge reading 26 is a comparison between the two orifices, the needle valve 27 and the gap between the gauge head 16 and the internal surface of the tube.

A modified form of my invention is illustrated in FIGURES 3 and 4 for gauging the cross sectional area of a tube or the like as measured from the outside of the tube. Specifically a gauging head 40 in the form of a cylindrical body member 42 is connected to the pressure gauge 26, needle valve 27, and in turn to the source 28 of air under pressure such as is generally illustrated in FIGURE 8. The fluid or air enters the body member 42 through an opening 44. Both ends 46, 48 of the gauge head 40 have gauging openings or apertures 50, 52 extending between the inside and the outside of the gauge head. Each aperture 50 and 52 has a surface which is called a gauging surface or ring which has a predetermined cross sectional area calibrated at the time the gauge head is made. A tube 54 whose outside dimension is sought is inserted through the apertures or gauging surfaces 50 and 52. The fluid from the source 28 is admitted through opening 44 to the internal cavity 56 of the gauge head with substantially unrestricted flow, thereby adding substantially no back pressure to the fluid. The fluid or air will flow or escape around the outer periphery of the tube 54 between said periphery and the gauging surfaces or apertures 50 and 52. The extent of the restriction of the flow of fluid between said gauging surfaces and said tube creates a back pressure on the gauge 26, which gauge 26 is calibrated to read a cross sectional area or dimension of the tube 54. If the surface of the tube 54 has grooves, flats or ribs, the computation will include the grooves, flats or ribs as part of the cross sectional area. Since a rib on the tube will cut down the amount of fluid flowing past the gauging surface or a groove in the tube will increase the amount of fluid flowing past the gauging surface, the gauge 26 reading will include any surface discontinuities and produce an accurate cross sectional dimension at the point on the surface or in the plane lying transverse to the axis of the part where the measurements are made. It is believed to be obvious that one aperture 50 or 52 could be plugged whereby only the other aperture would serve as the gauging surface.

A still further modification of my invention is shown in FIGURES 5 and 6 wherein an elongated gauge head 60 is shown as having a tubular configuration throughout its length. The gauge head 60 has a body member 62 which has a fluid passage 64 extending substantially throughout one end portion of the body member. A probe 66 integrally formed on one end of said body member 60 has a conically shaped front end portion 68 and has an axially extending substantially uniform guide portion 70. The guide portion 70 is fluted or grooved axially along its outer surface sufficiently to permit relatively unrestricted flow of fluid past the guide 70. The guide portion 70 has flutes 71 and guide surfaces 72 as shown in one form in FIGURE 6 which produces a truncated triangle in cross section that permits the unrestricted flow of fluid past the probe 66. Spaced axially rearward of the probe 66 is a pair of gauge rings 73 and 74. These rings extend radially outward from the cylindrical surface of the body member 62 and are spaced apart axially a predetermined distance. The gauge rings 73 and 74 have diameters slightly less than the diameters of the exposed surfaces 72 of the guide portion 70 of the probe so that the probe will protect the rings from excessive wear. Between the gauge rings 73 and 74 is a recessed portion 75 of the gauge head 60 in which is formed one or more enlarged apertures 76 which communicates with the fluid passage 64 in the gauge head. The apertures 76 are of such a size as to substantially not restrict the flow of fluid from the source of fluid pressure. The peripheral surfaces of the gauge rings or surfaces 73, 74 have some axial length and are carefully controlled in manufacture to give a predetermined cross sectional area to said rings. The rings 73, 74 should be substantially identical in cross section.

With the gauge head 60 inserted into the opening in a tube 78 an amount sufficient to overlap the rings 73, 74 within the opening in the tube, the fluid can be turned on. As the fluid or air flows into the gauge head 60 and out through the apertures 76 in the recessed portion 75 of the gauge head, substantially no back pressure will be created on the gauge 26. The fluid will be forced to flow past the gauge surfaces or rings 73, 74 between the surface of the rings and the internal surface of the tube 78. The size of the opening through the tube 78 will be measured by the amount of pressure built up by the fluid flowing past the gauge rings 73, 74. The fluid, once it passes the rings 73, 74, should not be restrained in any way or it will create back pressure which will affect the readings on the pressure gauge. In the illustrated forms the fluid once past the gauge rings 73, 74, will flow past the body member 62 to the left in FIGURE 5 and past the fluted guide portion 70 of the probe 66 to the right. An exact reading of the cross sectional area of the tube 78 in alignment with the gauge rings 73, 74 will result.

FIGURE 7 shows another form of probe which could be substituted for the probe 66 in FIGURE 5. This probe 80 has a plurality of flutings 82 and guide surfaces 83 extending axially of the probe. In both FIGURE 6 and FIGURE 7 the probes 66 and 80 have the outer guide surfaces 72 and 83, respectively, lying in a circle which is slightly larger in diameter than the circle formed by the gauge rings 73, 74. These outer ends or guide surfaces 72, 83, respectively of the probes 66 and 80 are hardened so as not to wear upon repeated insertion and removal from tubes being dimensioned. The hardened surfaces of the probes and the slightly larger diameter of the probes as compared to the gauge surfaces or rings 73, 74 protect said gauge rings against wear, thereby assuring the gauge heads continued accuracy.

FIGURE 9 illustrates still another modified form of my invention wherein a gauge is used to dimension a blind opening in a part. Specifically, a gauge head 85 has a conduit opening 86 communicating with a source of fluid under pressure and with a recording gauge. The conduit opening 86 extends to the mouth 87 thereof whereupon the fluid can flow without restraint or back pressure. A gauge ring or gauge surface 88 is formed on the gauge head 85 and has a predetermined dimension. To measure the cross sectional area or to dimension the blind opening 89 in the part 90, the gauge ring 88 is held in the opening 89 with the fluid turned on. The flow of fluid past the gauge ring or surface 88 and the surface of the opening 89 will record the cross sectional dimension of the opening 89 on the recording gauge.

FIGURE 10 illustrates a few of the cross sectional shapes of gauge heads that can be used with my invention to measure substantially correspondingly shaped openings. Specifically, a square head 92, a triangular head 93 and a hexagonal head 94 are shown. With the gauge surface of any form of my invention shown in FIGURES 1, 2, 5 and 9, inclusive, formed in the shape of a square, triangle, hexagon, any irregular shape or the like, an internal surface of somewhat corresponding shape can be measured without departing from my invention. In like manner, an external, cross sectional shape of a square, triangle, hexagon or the like could be measured by the use of gauging apertures of similar shape and would be in the form of the invention shown in FIGURES 3 and 4. The invention is so versatile due to its lack of moving parts that shapes, internal and external, not heretofore able to be measured can now be measured with ease and simplicity.

While the forms of my invention herein shown and described constitute preferred forms of the invention, it is to be understood that the invention is not limited to these precise forms of apparatus, and that changes may be made therein without departing from the scope of the invention.

I claim:

1. In a gauging head for gauging the cross sectional area of a workpiece comprising a cylindrical body member connected to a source of fluid under pressure, a probe at the front end of said body member, at least one constant diameter round gauging means carried by said body member rearward of said probe, a recessed portion on said body member rearward of said gauging means, means communicating with said recessed portion for emitting a large volume of fluid under pressure from said fluid source through said body member, and sealing means on said body member spaced rearward from said recessed portion whereby inserting the probe into a workpiece with the sealing means bearing against the face of the workpiece will permit fluid to flow between the gauging means and the inside of the workpiece to measure the dimension of said inside of the workpiece.

2. A gauging device comprising a tubular body member adapted to be inserted in part into an opening in a workpiece, said body member havnig a probe with axially relieved portions therearound to permit relatively free passage of fluid thereby, a portion of the body member being hollow and communicating with a source of fluid under pressure, said hollow portion communicating with transversely open and enlarged apertures permitting substantially unrestricted flow of fluid, a pair of gauging rings encircling said body member and being positioned one on each end of the enlarged apertures in the body member, the diameters of the gauging rings being substantially equal to each other and being slightly smaller than the diameter of said probe whereby fluid under pressure passing through said apertures with the probe and gauging rings positioned in an opening in a workpiece will provide an accurate measure of the cross sectional area of the opening.

3. A gauging device comprising a shaped body member adapted to be inserted into an opening in a workpiece, said body member having a probe with an axially grooved portion to permit relatively free passage of fluid, said body member being hollow in part and communicating with a source of fluid under pressure, said hollow portion communicating with transversely disposed apertures permitting unrestricted flow of fluid from said passage, a pair of gauging means encircling said body member and being positioned one on each end of said apertures in the body member, the cross sectional areas of the gauging means being substantially equal to each other, whereby fluid under pressure passing through said apertures and between the gauging means and the surface of the workpiece will provide an accurate measure of the cross sectional area of said opening in the workpiece.

4. A gauging device comprising a body member, a probe on said body member, means on said probe for permitting free flow of fluid past said probe, said body member having a passage part way therethrough, said passage communicating with enlarged apertures opening outwardly through said body member, and a pair of gauging surfaces encircling said body member and being positioned one on each end of the enlarged apertures in said body member whereby fluid flowing from said apertures will flow past said guaging surfaces.

5. A gauging device comprising a shaped body member adapted to be inserted into an opening in a workpiece, said body member being hollow in part and communicating with a source of fluid under pressure, said hollow portion communicating with transversely disposed apertures permitting unrestricted flow of fluid from said passage, a pair of gauging means encircling said body member and being positioned one on each end of said apertures in the body member, the cross sectional areas of the guaging means being substantially equal to each other, whereby fluid under pressure passing through said apertures and between the gauging means and the surface of the workpiece will provide an accurate measure of the cross sectional area of said opening in the workpiece.

References Cited
UNITED STATES PATENTS 2,077,525  4/1937  Mennesson _____ 73—37.5 X

FOREIGN PATENTS 711,865  7/1954  Great Britain.
961,817  7/1947  France.

LOUIS R. PRINCE, *Primary Examiner.*

W. HENRY, *Assistant Examiner.*

U.S. Cl. X.R.

73—37.5